Jan. 2, 1951   R. F. SONTHEIM   2,536,824
LAMINATED MAGNETIC SUSPENSION
Filed Nov. 19, 1949
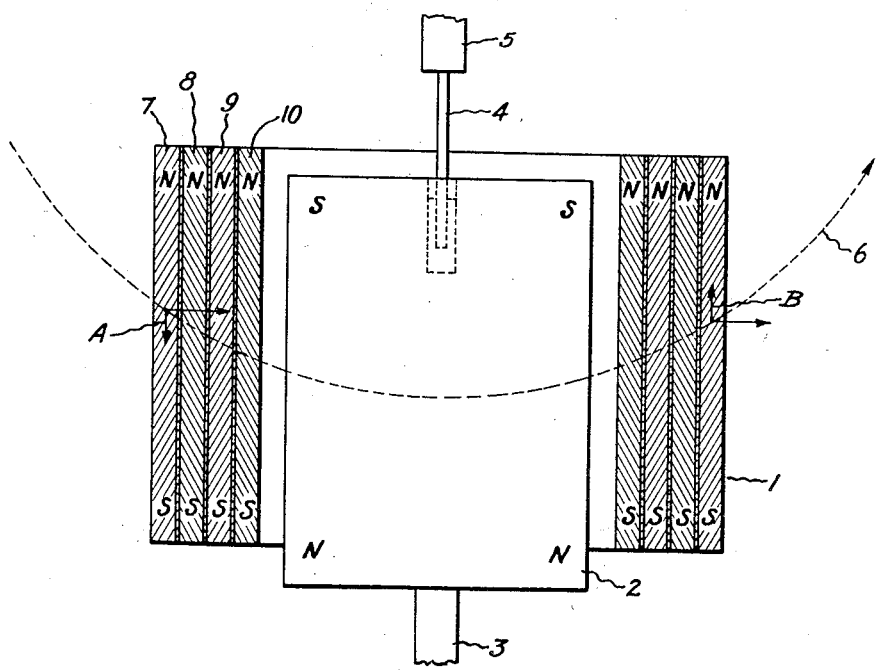
Inventor:
Rudolf F. Sontheim,
by Russell A. Warner
His Attorney.

Patented Jan. 2, 1951

2,536,824

UNITED STATES PATENT OFFICE 2,536,824

LAMINATED MAGNETIC SUSPENSION

Rudolf F. Sontheim, Lynn, Mass., assignor to General Electric Company, a corporation of New York Application November 19, 1949, Serial No. 128,311

3 Claims. (Cl. 308—1)

My invention relates to laminated permanent magnetic structures and, in particular, to a laminated permanent magnet for magnetic suspensions, and its object is to provide a satisfactory permanent magnetic suspension in which the permanent magnetic material of the suspension is laminated in the direction of its preferred magnetization or the flux axis to minimize the detrimental effects of certain surge fluxes on the suspension which might be caused by lightning or the like. The laminated structure is particularly useful when anisotropic permanent magnetic material is employed in the suspension.

The features of my invention which are believed to be novel and patentable will be pointed out in the claims appended hereto. For a better understanding of my invention, reference is made in the following description to the accompanying drawing in which Fig. 1 represents a magnetic suspension with the outer magnet shown in cross section, and which is laminated in the direction of preferred magnetization to reduce effects of cross-magnetization.

Referring to the drawing, the magnetic suspension illustrated is of the general type described in United States Patent No. 2,311,382, February 16, 1943, to Hansen, Jr., and consists of an outer hollow cylindrical permanent magnet or structure 1 and an inner cylindrical permanent magnet 2. The outer and inner magnets are permanently magnetized in the direction of their cylindrical axes and in opposite axial directions as represented by the N and S polarity marks thereon. The outer magnet 1 is preferably stationary, and the inner magnet is secured to a shaft 3 which is rotatable and is the shaft of the rotary element of some device such, for example, as an induction watthour meter or measuring instrument. The shaft 3 and inner magnet 2 are maintained in concentric relation with respect to the outer magnet 1 by suitable supporting structure and guide bearings, one of which is shown and consists of a guide pin 4 secured in stationary structure 5, and extending downward and entering a guide bearing opening in the top of magnet 2. Such guide bearings will permit the shaft 3 to rotate freely and to move up and down within desired limits. The purpose of such a suspension is magnetically to support the weight of the vertical shaft rotating element and thus eliminate a large part of the friction that would otherwise be present. The assembly is arranged such that when the rotor element is at its proper elevation, its weight is supported magnetically with the inner magnet lowered with respect to the outer magnet as represented. It is evident that in such an arrangement the magnetic forces of the two magnets create a lifting force on the inner magnet 2, and that by proper design, such lifting force can be made equal to the weight of the rotor element at some relative positions of the magnets where the magnetic forces are utilized efficiently.

In such magnetic suspensions it is important that the magnetic forces created shall be and remain symmetrical with respect to the axis of rotation in order that no side thrust be present in any rotary position or positions of the rotor element, and if it be assumed that the magnets are symmetrical and symmetrically magnetized and concentrically arranged, there will be no side thrust due to a nonsymmetrical lateral magnetic attraction between the magnets in any relatively rotary position. Such symmetry is also desirable to eliminate magnetic torque components in the suspension that might otherwise tend to rotate the shaft 3 and magnet 2 to a certain rotary position or positions.

It is conceivable that during the use of the apparatus, a heavy surge flux in a direction generally crosswise of the axis of the suspension such as indicated by the dotted line arrow 6, Fig. 1, caused by lightning or some short circuit condition in the immediate vicinity of the suspension might occur. In a nonlaminated suspension made of isotropic permanent magnet material, such a surge might easily cause sufficient cross-magnetization as to be harmful. If the nonlaminated suspension were made of anisotropic material, less cross-magnetization would occur, but the components of the surge flux in directions parallel to the axis of preferred magnetization such as the components A and B, Fig. 1, would be likely to produce damaging results because they are in opposite axial directions on opposite sides of the axis of rotation. One of these components would tend to increase the strength of the original permanent magnetization on one side of the suspension, and the other component would tend to decrease or reverse the original permanent magnetization on the other side of the suspension, and as a result the symmetry of magnetic forces in the suspension in planes perpendicular to the axis of rotation would be destroyed. This may be considered as a form of cross-magnetization.

When the outer magnet of the suspension is laminated in accordance with this invention, the reluctance through the suspension at right angles to the axis of rotation is increased and there is less penetration of the flux surge into and through the material. Such surge flux as does pass into the material tends to be confined to the outer layer or layers of the laminated suspension and to flow around the outside layer of the suspension from one side of the suspension to the other as in the layer 7, Fig. 1, and in the shortest path through such outer layer or layers. Any surge flux that penetrates to an inner layer or layers crosses the air gaps between the laminations through the shortest distance, or at right angles to such air gaps, and then tends to flow around through such inner lamination from one side to the other through the shortest path instead of penetrating further into the suspension. As a result the surge flux distribution in the suspension is reduced and its direction changed so that there is less tendency for it to flow parallel to the preferred direction of magnetization in either direction in the material. Hence, anisotropic material may be used, and the benefit of its higher resistance to cross-magnetization utilized. Should cross-magnetization result, it is largely confined to the outer layer remote from the relatively rotatable surfaces of the suspension where it can do the least harm. Thus, the object of the invention of preventing or greatly reducing the possibility of surge flux linkage and reducing its harmful effects on the suspension is obtained by lamination of the permanent magnet material in the direction of its magnetic axis and, preferably, it is the outer magnet 1 which is so laminated. As will be noted, the outer magnet 1 is made up of a plurality of concentric cylinders 7, 8, 9, and 10, closely nestled and secured together as a unit. The interstices or spaces between the parts 7, 8, 9, and 10 may be filled with a material which is nonmagnetic and which serves to bind the parts together into a solid unit, but which provides uniform concentric magnetic air gaps between the cylinders 7, 8, 9, and 10, so that the magnetic reluctance in any direction crosswise of the cylindrical axis of the outer magnet is increased as compared to a solid magnet. This, of course, also increases the crosswise magnetic reluctance of the suspension as a whole. The magnet 2 is within the outer magnet and thus has the protection afforded by the shielding effect of the outer magnet.

I may make the nonmagnetic binder material in the interstices of electrical conducting material such as solder, aluminum, copper, or some suitable nonmagnetic die-casting conductor alloy that can be readily melted and flowed into the interstices and permitted to solidify. If flux surges attempt to pass through these layers of conducting material, eddy currents will be set up therein which in turn will oppose the passage of such flux surges.

The lamination of the outer magnet 1 makes it easy to build up this magnet from different kinds of permanent magnet materials, if desired, selected with a view to providing the best over-all characteristics for the application in which it will be used. From the standpoint of this invention it will be desirable to make one or more of the outer laminations anisotropic.

While the invention has been described in connection with a magnetic suspension, it is believed that the lamination of a permanent magnet structure in the manner and having the several beneficial results described herein will be useful for other applications and, hence, I do not wish to confine my invention to any particular application.

The number and spacing between the sections such as sections 7, 8, 9, and 10 of the laminated permanent magnet may vary. In general, the larger the number of such laminations and the bigger the air gap spacing between them, the smaller will be the undesirable flux linkages for a given size of the structure. For a watthour meter the magnetic suspension may be construed as in Fig. 1, with a length of the outer magnet of 0.4 inch, outside diameter 0.585 inch, and inside diameter of 0.375 inch, and with a thickness of each ring lamination of approximately 0.025 inch and the equivalent of an air gap spacing between laminations of the order of 0.001 inch.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A permanent magnet structure permanently magnetized along a given axis, said structure being made up of a plurality of concentric cylinders closely nestled together with their axes extending parallel to the magnetic axis and united into a solid unitary mechanical structure by thin layers of nonmagnetic conductor material completely separating the several cylinders, at least a portion of said cylinders being magnetically anisotropic.

2. A magnetic suspension permanent magnet assembly comprising an inner cylindrical permanent magnet and an outer cylindrical permanent magnet structure, said permanent magnet and structure being permanently magnetized in opposite axial directions, means for maintaining said magnet and structure in concentric relation said inner cylindrical magnet being otherwise free to rotate and move endwise relative to said outer structure, said outer permanent magnet structure being made up of a plurality of concentric cylinders of permanent magnet anisotropic material separated by thin layers of a nonmagnetic material which unites the different parts of said structure into a solid unitary whole.

3. A permanent magnet structure permanently magnetized along a given axis, said structure being made up of a plurality of concentric hollow cylinders of permanent magnet material closely nestled together with their axes parallel to the magnetic axis, said cylinders being united into a solid unitary mechanical structure, with the several cylinders being magnetically separated from each other by the equivalent of an air gap spacing of the order of 0.001 inch, all of said cylinders being permanently magnetized.

RUDOLF F. SONTHEIM.

REFERENCES CITED

The following references are of record in the file of this patent:

UNITED STATES PATENTS

| Number | Name | Date |
|---|---|---|
| 1,986,856 | Ringel | Jan. 8, 1935 |
| 2,311,382 | Hansen, Jr. | Feb. 16, 1943 |

FOREIGN PATENTS

| Number | Country | Date |
|---|---|---|
| 504,435 | Great Britain | Apr. 25, 1939 |
| 559,526 | Great Britain | Feb. 23, 1944 |